(12) United States Patent
Lykkegaard et al.

(10) Patent No.: US 11,746,744 B2
(45) Date of Patent: Sep. 5, 2023

(54) EQUIPOTENTIAL BONDING OF WIND TURBINE ROTOR BLADE

(71) Applicant: Vestas Wind Systems A/S, Aarhus N (DK)

(72) Inventors: Lasse Lykkegaard, Herning (DK); Rens Christiaan Verhoef, Ringkøbing (DK); Gurmukh Singh, Skjern (DK); Nathan A. Brilliant, Arvada, CO (US); Toby Collard, Cowes (GB)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/781,397

(22) PCT Filed: Dec. 2, 2020

(86) PCT No.: PCT/DK2020/050342
§ 371 (c)(1),
(2) Date: Jun. 1, 2022

(87) PCT Pub. No.: WO2021/110225
PCT Pub. Date: Jun. 10, 2021

(65) Prior Publication Data
US 2023/0003186 A1 Jan. 5, 2023

Related U.S. Application Data

(60) Provisional application No. 62/943,396, filed on Dec. 4, 2019.

(30) Foreign Application Priority Data

Jan. 23, 2020 (DK) .............................. PA 2020 70046

(51) Int. Cl.
*F03D 1/06* (2006.01)
*F03D 80/30* (2016.01)

(52) U.S. Cl.
CPC .......... *F03D 1/0675* (2013.01); *F03D 80/30* (2016.05); *F05B 2280/6003* (2013.01)

(58) Field of Classification Search
CPC .... F03D 1/0675; F03D 1/0683; F03D 1/0633; F03D 1/0641; F03D 80/30
See application file for complete search history.

(56) References Cited

U.S. PATENT DOCUMENTS 10,125,744 B2 * 11/2018 March Nomen ....... F03D 80/30
11,592,007 B2 * 2/2023 Thwaites ............... B29C 70/30
(Continued)

FOREIGN PATENT DOCUMENTS

WO 2013087078 A1 6/2013

OTHER PUBLICATIONS

Danish Patent and Trademark Office, Search and Examination Report in PA 202070046, dated Jul. 13, 2020.
(Continued)

*Primary Examiner* — Justin D Seabe
(74) *Attorney, Agent, or Firm* — Wood Herron & Evans LLP (57) ABSTRACT

A wind turbine rotor blade having a blade shell with a generally chordwise layup of fibre plies and a generally spanwise spar cap. A lightning conductor extends over the spar cap, and the spar cap includes conductive material. An equipotential bonding element electrically bonds the lightning conductor to the spar cap. The equipotential bonding element extends between an outboard edge of one stack of the fibre plies and an inboard edge of an adjacent stack of the fibre plies, which overlap to define an overlapping edge region.

26 Claims, 7 Drawing Sheets

(56) References Cited

U.S. PATENT DOCUMENTS

| | | | |
|---|---|---|---|
| 11,668,276 B2* | 6/2023 | García Ayerra | F03D 1/0675 416/241 R |
| 2013/0149153 A1* | 6/2013 | Fujioka | H02G 13/00 416/229 R |
| 2015/0292479 A1 | 10/2015 | Ohlerich et al. | |
| 2018/0156202 A1* | 6/2018 | Lipka | F03D 80/30 |
| 2019/0211806 A1 | 7/2019 | Girolamo et al. | |
| 2020/0263657 A1* | 8/2020 | Badger | F03D 3/062 |

OTHER PUBLICATIONS

European Patent Office, International Search Report and Written Opinion in PCT Application No. PCT/DK2020/050342, dated Mar. 17, 2021.

* cited by examiner

Section A-A
FIG. 4a

Detail C
FIG. 13

FIG. 16

EQUIPOTENTIAL BONDING OF WIND TURBINE ROTOR BLADE

FIELD OF THE INVENTION

The present invention relates to a wind turbine rotor blade, and in particular to equipotential bonding within the wind turbine rotor blade, and to a method of manufacturing a wind turbine rotor blade.

BACKGROUND OF THE INVENTION

A wind turbine converts kinetic energy of the wind into electrical energy. A generator converts the wind energy captured by a rotor having one or more rotor blades into electrical energy that is usually supplied to a utility grid. The generator is housed in a nacelle together with the various components required to operate and optimize the performance of the wind turbine. A tower supports the load presented by the nacelle and the rotor. In a horizontal axis wind turbine (HAWT) the rotor blades extend radially outwardly from a central hub which rotates about a longitudinal axis aligned generally horizontally. In operation, the blades are configured to interact with the passing air flow to produce lift that causes the rotor to rotate within a plane substantially perpendicular to the direction of the wind.

A conventional rotor blade is made from an outer shell and a spar structure. The spar structure serves to transfer loads from the rotating blade to the hub of the wind turbine. Such loads include tensile and compressive loads directed along the length of the blade arising from the circular motion of the blade and loads arising from the wind which are directed along the thickness of the blade, i.e. from the windward side of the blade to the leeward side. The spar structure comprises one or more shear webs extending between spar caps. The spar caps may be incorporated into the outer shell or may be attached to the outer shell.

The spar cap may include pultruded fibrous strips of material. Pultrusion is a continuous process similar to extrusion, wherein fibres are pulled through a supply of liquid resin and then heated in an open chamber where the resin is cured. The resulting cured fibrous material is of constant cross section but, since the process is continuous, the material once formed may be cut to any arbitrary length.

WO 2013/087078 describes a wind turbine blade with an elongate reinforcing structure comprising a stack of pultruded fibrous composite strips. The pultruded fibres are carbon fibres and extend almost the full length of the blade from root to tip.

The general trend in the wind turbine industry over the past several years has been for wind turbine blades to be made longer. The longer the blades, the larger the rotor and the more wind energy can be captured, improving the efficiency of an individual wind turbine.

Wind turbines are susceptible to lightning strikes. It is common for a wind turbine to include a lighting protection system, which electrically couples the wind turbine components to the ground. The blades, and in particular the blade tips, are particularly susceptible to lighting strikes. The blades may include a metallic foil, or surface protection layer (SPL), incorporated into the outer shell near the outer surface of the blade. The metallic foil may cover only a portion or substantially the entire blade outer surface. Additionally, or alternatively, the lightning protection system may include one or more discrete lightning receptors. The metallic foil and/or the lightning receptors on the blade are all electrically connected through the tower and nacelle to ground.

Although lightning strikes have a natural tendency, due to their high frequency, to follow along the outside surface of a structure, such as the rotor blade, the presence of conductive fibres in the blade shell may cause unwanted discharges when a lightning strike occurs that could cause damage to the blade shell. This problem may be exacerbated where the conductive fibres are continuous and extend along a substantial length of the rotor blade, especially for a long blade.

SUMMARY OF THE INVENTION

A wind turbine rotor blade having a blade shell with a generally chordwise layup of fibre plies and a generally spanwise spar cap. A lightning conductor extends over the spar cap, and the spar cap includes conductive material. An equipotential bonding element electrically bonds the lightning conductor to the spar cap. The equipotential bonding element extends between an outboard edge of one stack of the fibre plies and an inboard edge of an adjacent stack of the fibre plies, which edges overlap to define an overlapping edge region.

In particular, a first aspect of the invention provides a wind turbine rotor blade having a root end and a tip end, comprising: a wind turbine blade shell that defines a suction side, pressure side, leading edge, and a trailing edge of the blade; at least one spar cap associated with the blade shell and including a conductive material; a lightning conductor; and an equipotential bonding element electrically bonding the lightning conductor to the spar cap, wherein the blade shell includes a plurality of stacks of fibre plies, each stack of fibre plies has an inboard edge towards the root end of the blade, an outboard edge towards the tip end of the blade, a forward edge towards the leading edge of the blade, and a rear edge towards the trailing edge of the blade, wherein the equipotential bonding element extends between an outboard edge of one stack and an inboard edge of an adjacent stack which overlap to define an overlapping edge region extending across the spar cap.

The invention may take the benefit of a chordwise layup of the stacks of fibre plies to provide a route through for the equipotential bonding element from the lightning conductor to the spar cap.

The equipotential bonding element may have a first end attached to and in electrical contact with the lightning conductor, and a second end attached to and in electrical contact with the spar cap.

The spar cap may have an outer side, and an inner side nearest an interior of the blade. The equipotential bonding element may be attached to and in electrical contact with the outer side of the spar cap.

The equipotential bonding element may be a strip or ribbon, preferably comprising electrically conductive wire or yarn woven into a fabric.

The equipotential bonding element may be attached to the lightning conductor and to the spar cap, the equipotential bonding element defining a path between an attachment point with the lightning conductor and the spar cap, the path extending from the lightning conductor to the spar cap in a direction only away from the attachment point and not also back towards the attachment point.

The spar cap may include a stack of layers of conductive material, preferably carbon fibre material, preferably pultruded carbon fibre composite material.

The spar cap may have an abraded portion to reveal the conductive material where the equipotential bonding element is attached to and in electrical contact with the spar cap.

At least one of the layers of the spar cap may be chamfered at at least one end thereof such that the thickness of the layer is tapered towards at least one end.

The layer of the spar cap nearest the lightning conductor may have a chamfered end and an abraded portion on the same side of the layer facing towards the lightning conductor.

The stacks of fibre plies of the blade shell may include glass fibre material.

The stacks of fibre plies of the blade shell may have their forward edges at or adjacent the leading edge of the blade, and their rear edges at or adjacent the trailing edge of the blade.

Each stack of fibre plies of the blade shell may be provided as a preform.

The overlapping edges of the adjacent stacks of fibre plies may be formed by consecutively terminating individual layers in the stack to form a staircase or ramp.

The lightning conductor may be a metallic foil of a lightning protection system.

The lightning conductor may be at an outer surface of the blade.

The wind turbine rotor blade may further comprise a plurality of the equipotential bonding elements.

A plurality of the equipotential bonding elements may extend between the outboard edge of one stack and the inboard edge of the adjacent stack.

A plurality of pairs of adjacent stacks may be spaced spanwise along the blade and may have at least one of the equipotential bonding elements extending between the outboard edge of one stack and the inboard edge of the adjacent stack in the pair.

The lightning conductor and the equipotential bonding element may be integrally formed.

A further aspect of the invention provides a method of manufacturing a wind turbine rotor blade having a root end and a tip end, comprising: laying up a shell of a wind turbine rotor blade that defines a suction side, pressure side, leading edge, and a trailing edge of the blade, the shell including a plurality of stacks of fibre plies and a lightning conductor, each stack of fibre plies has an inboard edge towards the root end of the blade, an outboard edge towards the tip end of the blade, a forward edge towards the leading edge of the blade, and a rear edge towards the trailing edge of the blade; laying up a spar cap such that the lightning conductor extends over the spar cap, wherein the spar cap includes conductive material; and providing an equipotential bonding element to electrically bond the lightning conductor to the spar cap, the equipotential bonding element extending between an outboard edge of one stack and an inboard edge of an adjacent stack which overlap to define an overlapping edge region extending across the spar cap.

Each stack of fibre plies of the blade shell may be laid up in a mould as a preform, and the method may further comprise infusing the preforms with resin and curing.

The equipotential bonding element may be attached to one of the stacks of fibre plies of the blade shell prior to being laid up.

The lightning conductor and the equipotential bonding element may be integrally formed and the lightning conductor and the equipotential bonding element may be attached to one of the stacks of fibre plies of the blade shell prior to being laid up.

BRIEF DESCRIPTION OF THE DRAWINGS

Embodiments of the invention will now be described with reference to the accompanying drawings, in which:

FIG. 4b shows a detail view of the outer shell, spar cap and shear web at B in FIG. 4a;

DETAILED DESCRIPTION OF EMBODIMENT(S)

In this specification, terms such as leading edge, trailing edge, pressure surface, suction surface, thickness, chord and planform are used. While these terms are well known and understood to a person skilled in the art, definitions are given below for the avoidance of doubt.

The term leading edge is used to refer to an edge of the blade which will be at the front of the blade as the blade rotates in the normal rotation direction of the wind turbine rotor.

The term trailing edge is used to refer to an edge of a wind turbine blade which will be at the back of the blade as the blade rotates in the normal rotation direction of the wind turbine rotor.

The chord of a blade is the straight line distance from the leading edge to the trailing edge in a given cross section perpendicular to the blade spanwise direction.

A pressure surface (or windward surface) of a wind turbine blade is a surface between the leading edge and the trailing edge, which, when in use, has a higher pressure than a suction surface of the blade.

A suction surface (or leeward surface) of a wind turbine blade is a surface between the leading edge and the trailing edge, which will have a lower pressure acting upon it than that of a pressure surface, when in use.

The thickness of a wind turbine blade is measured perpendicularly to the chord of the blade and is the greatest distance between the pressure surface and the suction surface in a given cross section perpendicular to the blade spanwise direction.

The term spanwise is used to refer to a direction from a root end of a wind turbine blade to a tip end of the blade, or vice versa. When a wind turbine blade is mounted on a wind turbine hub, the spanwise and radial directions will be substantially the same.

A view which is perpendicular to both of the spanwise and chordwise directions is known as a planform view. This view looks along the thickness dimension of the blade.

The term spar cap is used to refer to a longitudinal, generally spanwise extending, reinforcing member of the blade. The spar cap may be embedded in the blade shell, or may be attached to the blade shell. The spar caps of the windward and leeward sides of the blade may be joined by one or more shear webs extending through the interior hollow space of the blade. The blade may have more than one spar cap on each of the windward and leeward sides of the blade. The spar cap may form part of a longitudinal reinforcing spar or support member of the blade. In particular, the first and second spar caps may form part of the load bearing structure extending in the longitudinal direction that carries the flap-wise bending loads of the blade.

The term shear web is used to refer to a longitudinal, generally spanwise extending, reinforcing member of the blade that can transfer load from one of the windward and leeward sides of the blade to the other of the windward and leeward sides of the blade.

Figure 1:
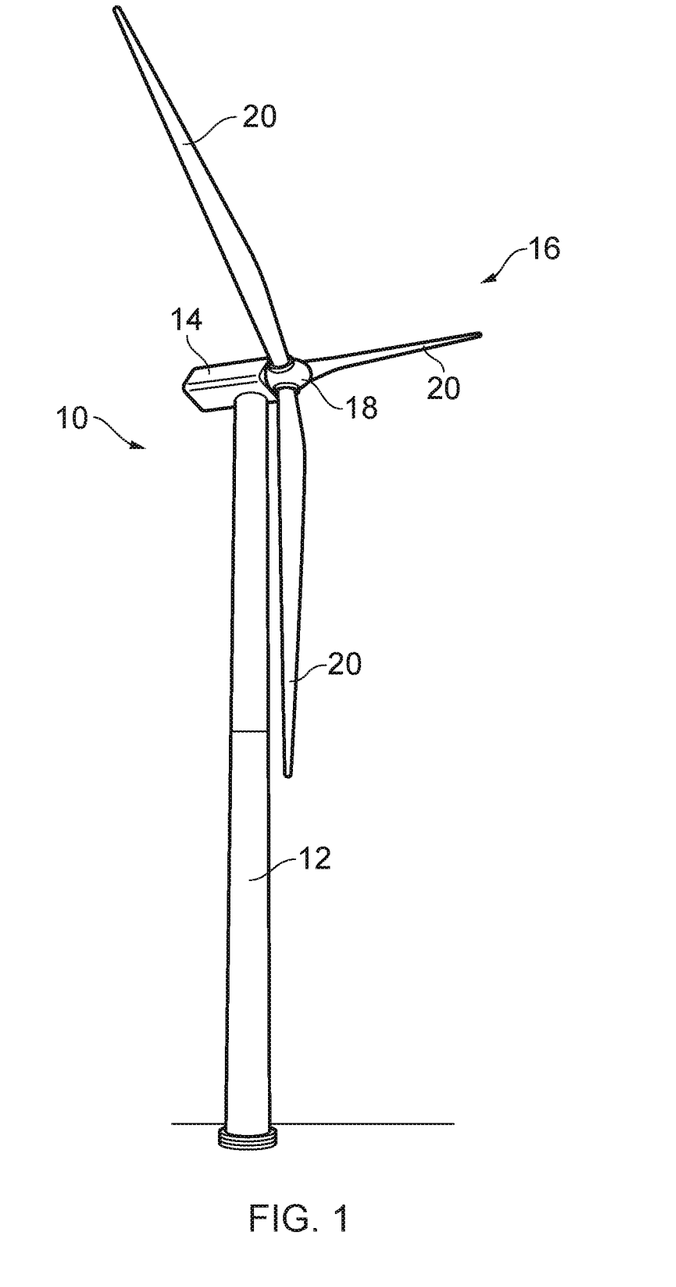
FIG. 1 shows a wind turbine.

FIG. 1 shows a wind turbine 10 including a tower 12 mounted on a foundation and a nacelle 14 disposed at the apex of the tower 12. The wind turbine 10 depicted here is an onshore wind turbine such that the foundation is embedded in the ground, but the wind turbine 10 could be an offshore installation in which case the foundation would be provided by a suitable marine platform.

A rotor 16 is operatively coupled via a gearbox to a generator (not shown) housed inside the nacelle 14. The rotor 16 includes a central hub 18 and a plurality of rotor blades 20, which project outwardly from the central hub 18. It will be noted that the wind turbine 10 is the common type of horizontal axis wind turbine (HAWT) such that the rotor 16 is mounted at the nacelle 12 to rotate about a substantially horizontal axis defined at the centre at the hub 18. While the example shown in FIG. 1 has three blades, it will be realised by the skilled person that other numbers of blades are possible.

When wind blows against the wind turbine 10, the blades 20 generate a lift force which causes the rotor 16 to rotate, which in turn causes the generator within the nacelle 14 to generate electrical energy.

Figure 2:
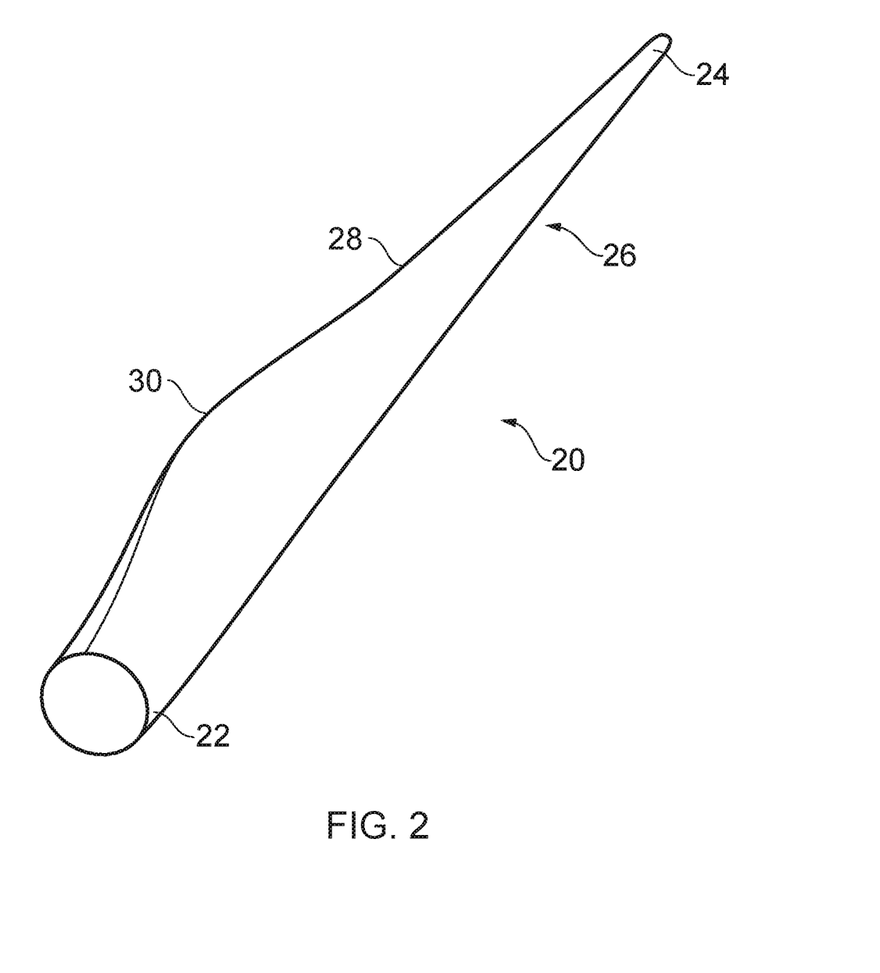
FIG. 2 shows a wind turbine blade.

FIG. 2 illustrates one of the wind turbine blades 20 for use in such a wind turbine. Each of the blades 20 has a root end 22 proximal to the hub 18 and a tip end 24 distal from the hub 18. A leading edge 26 and a trailing edge 28 extend between the root end 22 and tip end 24, and each of the blades 20 has a respective aerodynamic high pressure surface (i.e. the pressure surface) and an aerodynamic low pressure surface (i.e. the suction surface) surface extending between the leading and trailing edges of the blade 20.

Each blade has a cross section which is substantially circular near the root end 22, because the blade near the root must have sufficient structural strength to support the blade outboard of that section and to transfer loads into the hub 18. The blade 20 transitions from a circular profile to an aerofoil profile moving from the root end 28 of the blade towards a "shoulder" 30 of the blade, which is the widest part of the blade where the blade has its maximum chord. The blade 20 has an aerofoil profile of progressively decreasing thickness in an outboard portion of the blade, which extends from the shoulder 30 to the tip end 24.

Figure 3:
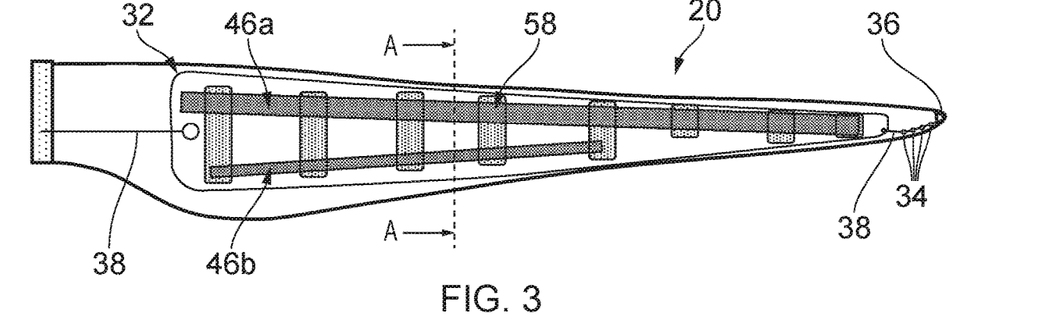
FIG. 3 shows a schematic plan view of a wind turbine blade with lightning protection features.

As shown schematically in FIG. 3, the blade 20 includes one or more lightning receptors and one or more lightning 'down conductors' which form part of a lightning protection system for the wind turbine. The lightning receptors attract the lightning strike and the down conductors conduct the energy of the lightning strike down the blade 20 via the nacelle 14 and tower 12 to a ground potential. The lightning conductor may take a variety of forms, such as a surface metallic foil 32 on the outer surface of the blade or a cable 38, e.g. running through the interior of the hollow blade. The lightning receptors may include the metallic foil 32 and/or discrete lightning receptors 34 installed on the outer surface of the blade, or a solid metal tip 36 or metal coated laminate (e.g. a copper cap) may be provided conformal with the shape of the blade nearest the tip end 24, for example. The discrete lightning receptors 34 and metal tip 36 may be electrically connected to the lightning conductor(s).

The majority of the outer surface of the blade 20 may be covered with the metal foil 32. The metal foil 32 may act as either a lightning receptor, a down conductor, or both. The down conductor may extend substantially the full length of the blade. Where the majority of the outer surface of the blade 20 is covered with the metal foil 32 the cable 38 may connect to the metal foil 32 adjacent the tip end 24 of the blade and adjacent the root end 22 of the blade, with no cable 38 along the majority of the length of the blade covered with the metal foil 32. The metal foil 32 may extend from root to tip in which case there may be no need for cable 38. The metal foil 32 may extend in sections along the length of the blade with cable sections between the metal foil sections. Cable 38 may alternatively extend under the metal foil 32 (inside the blade) so that the cable 38 and metal foil 32 are electrically connected in parallel. Alternatively the blade may have a larger number of the discrete lightning receptors on the blade surface, electrically connected via a down conductor cable that runs substantially the full length of the blade, instead of having the metal foil.

At the root end 22 of the blade 20, the down conductor 38 may be electrically connected via an armature arrangement to a charge transfer route via the nacelle 14 or hub 18 and tower 12 to a ground potential. Such a lightning protection system therefore allows lightning to be channelled from the blade to a ground potential safely, thereby minimising the risk of damage to the wind turbine 10.

Figure 4A:
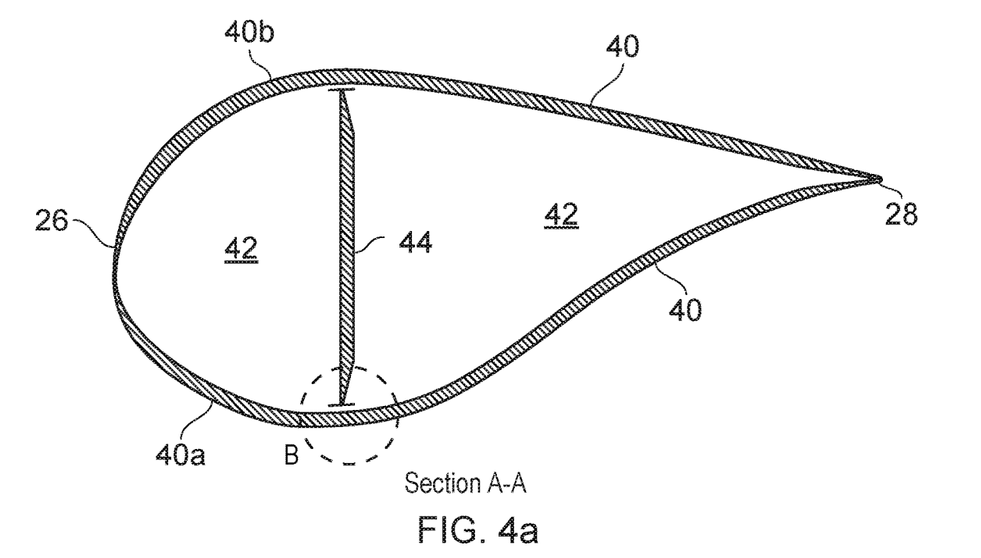
FIG. 4a shows a section view of the hollow blade along A-A in FIG. 3.

As shown in FIG. 4a, the wind turbine blade 20 includes an outer blade shell 40. The blade shell defines a suction side (comprising the suction surface), a pressure side (comprising the pressure surface), the leading edge, and the trailing edge. The blade shell also defines a hollow interior space 42 with a shear web 44 extending internally between upper and lower parts of the blade shell 40. The blade shell 40 may comprise two half-shells 40a, 40b which are separately moulded before being joined together (at the leading edge 26 and the trailing edge 28) to form the blade 20. It will be appreciated that the blade shell 40 need not be formed as two half-shells which are subsequently joined together but may be formed as a unitary shell structure, together with the shear web 42, in a "one shot" single shell process.

Figure 4B:
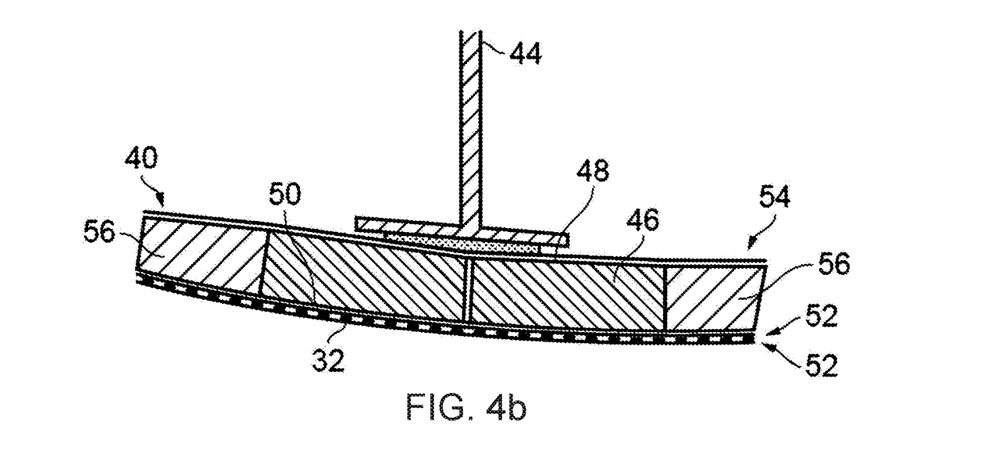
Figure 8:
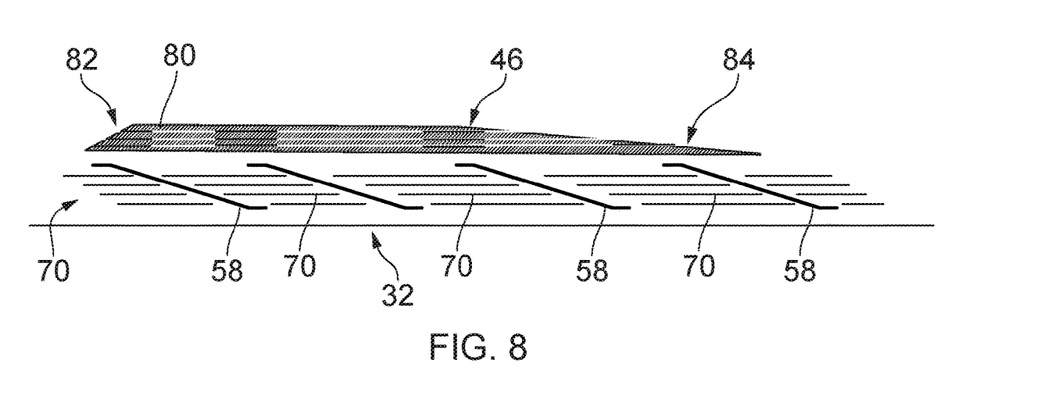
FIG. 8 shows a first example wherein the equipotential bonding elements are laid up between the stacks of plies and directly contact the surface protection layer at one end and the spar cap at their other ends.

FIG. 4b shows a detail view of the region where the shear web 44 meets the blade shell 40. A spar cap 46 may be incorporated into the outer shell 40, as shown in FIG. 4b, or may be attached to the outer shell 40. The spar cap 46 is an elongate reinforcing structure extending substantially along the full length of the blade 20 from the root end 22 to the tip end 24. The spar cap 46 includes conductive material, such as carbon fibres. In particular, the spar cap 46 comprises layers of conductive material 80 (as shown in FIG. 8) For example, the spar cap may include pultruded fibrous strips of material such as pultruded carbon fibre composite material or other carbon fibre reinforced polymer material.

Returning to FIG. 3, the blade 20 may have more than one spar cap 46 incorporated in, or attached to, the upper and lower parts of the blade shell 40. In the illustrated example, the blade 20 has main spar caps 46a with the shear web 44 extending between, and rear spar caps 46b (also known as stringers) which may or may not have a shear web extending between.

Each spar cap 46 may include a stack of layers of conductive material. The shear web 44 may be adhesively bonded to an inner surface 48 of the spar cap 46. An outer surface 50 of the spar cap 46 may sit adjacent the lightning conductor in the outer surface of the blade shell 40. As shown in FIG. 4b, the lightning conductor may be in the form of the metal foil 32 which is separated from the outer surface 50 of the spar cap 46 by one or more layers of insulating material 52, such as glass fibre reinforced polymer. One or more further layers 52 of glass fibre reinforced polymer may be provided over the outside of the metallic foil 32. The layers 52 collectively form an outer skin of the blade shell 40. One or more further layers of glass fibre reinforced polymer provide an inner skin 54 of the blade shell 40 with a core material 56 between the outer skin 52 and the inner skin 54. The core material may be a light structural foam, though other core materials such as wood, particularly balsa wood, and honeycomb may alternatively be used to provide a lightweight core material. It will be appreciated that a near identical connection is made between the shear web 44 and the other side of the blade shell 40.

Figure 5:
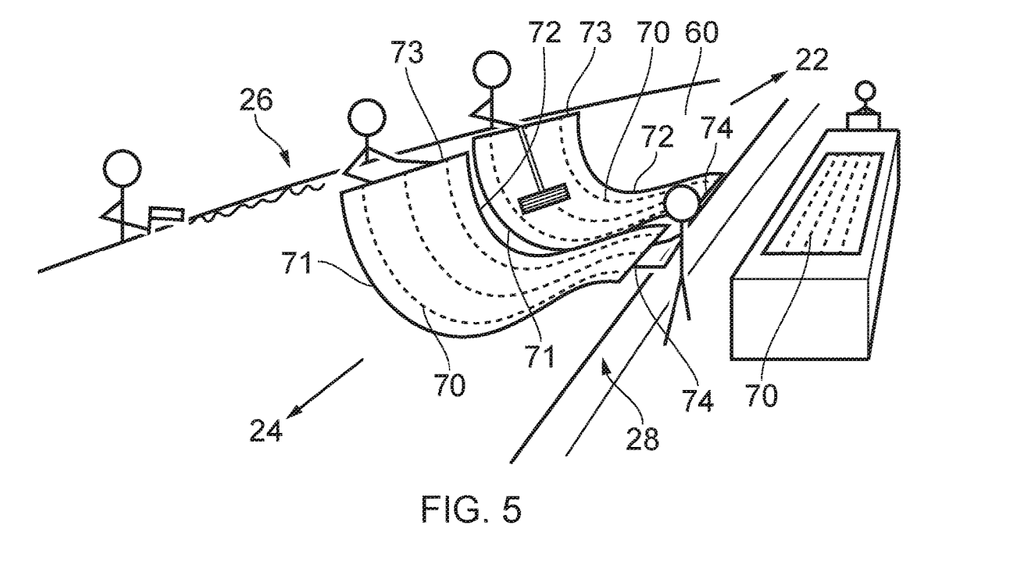
FIG. 5 shows a schematic of chordwise layup of the outer shell in a mould.

The structure of the blade shell 40, and in particular the outer skin, and its method of manufacture will now be described in detail. As shown in FIG. 5, the layers 52 of glass fibre reinforced fabric are laid up in a mould 60 as stacks of fibre plies 70. The stack of fibre plies 70 may include a plurality of fibre plies stitched or otherwise attached together as a kit. The stacks of fibre plies 70 may be pre-cut to fit the shape of the mould 60 such that the stacks of fibre plies 70 readily conform to the shape of the mould 60 and a number of plies may be laid up in the mould 60 easily and in a short time, preferably without the need for any cutting or detailed shaping of the plies once in the mould 60. Alternatively the plies may be cut in the mould 60. The stacks of fibre plies 70 may include dry fibres to be subsequently infused with resin or alternatively the fibre plies may be wet or semi-dry fibre plies, requiring no or only partial infusion of resin prior to consolidation and cure within the mould 60. The stack of fibre plies 70 may alternatively be laid up ply-by-ply in the mould 60. The stacks of fibre plies 70 may be prepared out of the mould 60 on a flat or near flat surface outside the mould such that the stack of fibre plies 70 assume their form or shape upon being laid up in the mould 60. Alternatively the stack of fibre plies 70 may be laid up on a suitably shaped surface outside the mould such that the stack of fibre plies 70 assume their (near final) form or shape outside the mould before being laid up in the mould 60. In the following the stacks of fibre plies, laid up outside the mould on any surface, are referred to as "preforms".

Particular to this invention, the stacks of fibre plies 70 each have an inboard edge 71 towards the root end 22 of the blade 20, an outboard edge 72 towards the tip end 24 of the blade, a forward edge 73 towards the leading edge 26 of the blade, and a rear edge 74 towards the trailing edge 28 of the blade.

Figure 6:
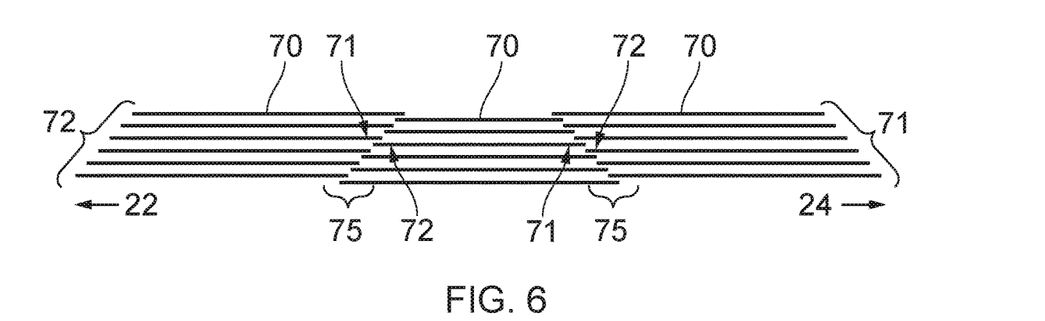
FIG. 6 shows a schematic spanwise section of the stacks of plies of the outer shell, showing the overlapping edges of the stacks of plies.

The stacks of fibre plies 70 are arranged such that an outboard edge 71 of one of the stacks 70 and an inboard edge 72 of an adjacent stack 70 overlap to define an overlapping region 75 extending across the spar cap. The overlapping region 75 extends generally transverse across the location of the spar cap 46. This is generally known as a "chordwise layup" of the preforms or stacks of fibre plies 70. Each of the stacks of fibre plies 70 may extend across the full chordwise width of the mould 60 such that the forward edge 73 of each stack of fibre plies 70 is at the leading edge 26 of the blade, and the rear edge 74 of each stack of fibre plies 70 is at the trailing edge 28 of the blade. Typically, the length of each stack of fibre plies 70 between the forward edge 73 and the rear edge 74 is greater than the width of the stack between the inboard edge 71 and the outboard edge 72. Note that this "chordwise layup" does not relate to any fibre direction of any of the plies that make up the stacks of fibre plies 70, and any individual ply may have a fibre direction.

Figure 7:
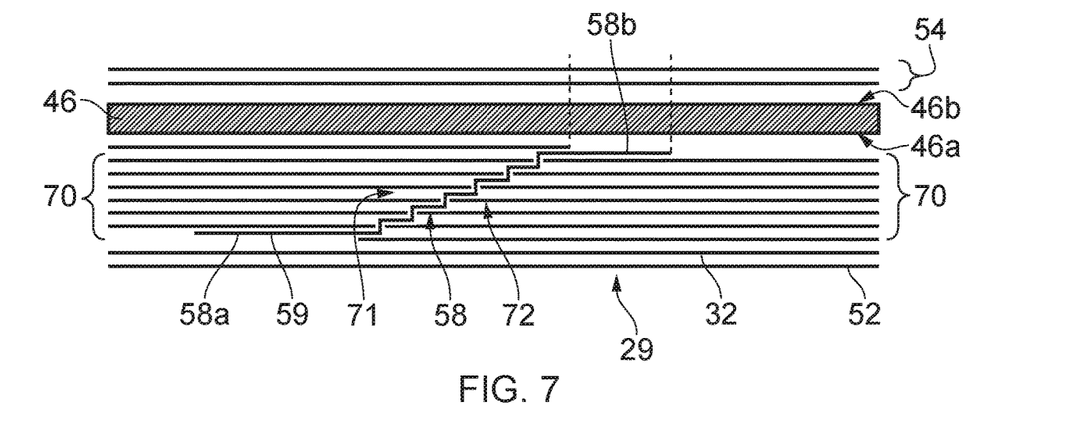
FIG. 7 shows a schematic spanwise section of an adjacent pair of stacks of plies of the outer shell, with the equipotential bonding element extending from the surface protection layer to the spar cap through the overlapping edges of the stacks of plies.

In order to avoid the risk of arcing between the conducting material of the spar cap 46 and the metal foil 32 or other lightning conductor, an equipotential bonding element 58 is used to equipotentially bond the lightning conductor to the conductive material of the spar cap 46, as shown in FIG. 7. By electrically bonding the lightning conductor 32 to the spar cap 46, the spar cap 46 may be held at the same potential as the lightning conductor such that in the event of a lightning strike undesirable discharges or arcs between the lightning conductor 32 and the spar cap 46 can be avoided.

The overlapping edges of the adjacent stacks of fibre plies 70 are formed by consecutively terminating individual plies in the stack to form a staircase or ramp. Advantageously, this consecutive termination of the individual plies in the stacks at the overlapping region 75 creates a stepwise path between the outboard edge 72 of one stack 70 and an inboard edge 71 of an adjacent stack 70 and through which the equipotential bonding element 58 extends so as to electrically bond the metallic foil 32, or other lightning conductor, to the spar cap 46.

The equipotential bonding element 58 has a first end 58a attached to and in electrical contact with the metallic foil 32 at an attachment point 59, and a second end 58b attached to and in electrical contact with the spar cap 46. The spar cap 46 has an outer side 46a nearest the outer surface 29 of the blade 20, and an inner side 46b nearest the hollow interior 42 of the blade 20. The equipotential bonding element 58 may be attached to and in electrical contact with the outer side 46a of the spar cap 46. The stepwise path that the equipotential bonding element 58 follows extends from the lightning conductor, metallic foil 32, to the spar cap 46 in a direction only away from the attachment point 59 with the lightning conductor and not also back towards the attachment point 59. That is to say, the equipotential bonding element 58 does not double back on itself in a U-shape. This may prevent arcing from one part of the equipotential bonding element to another part of the equipotential bonding element.

The equipotential bonding element 58 may comprise a strip of ribbon including electrically conductive material, or a conductive ply incorporated into the stack of plies, or a cable or series of cables or wires. For example, the equipotential bonding element 58 may comprise strands of electrically conductive material, such as metal wire, woven into a fabric material, such as glass fibre fabric. In an example the conductive material of the equipotential bonding element 58 may be copper coated with tin. The material may be chosen to avoid any galvanic reaction with either the lightning conductor 32 or the conductive material of the spar cap 46. In an example, the equipotential bonding element may comprise a conductive ply as a sheet of conductive mesh, e.g. a metal mesh or foil.

The metal foil 32 is commonly a metal mesh or expanded metal foil, or woven or knitted or perforated mesh, made of, for example, aluminium or copper. The copper coated with tin material of the equipotential bonding element 58 avoids a galvanic reaction with either the aluminium foil lightning conductor 32 or the carbon material of the spar cap 46.

The glass fibre material of the stacks of fibre plies 70 between the spar cap 46 and the lightning conductor 32 primarily distributes the mechanical load but the glass fibres also help avoid a galvanic response between the carbon of the spar cap and the aluminium of the metal foil 32. Of course, it will be appreciated that the lightning conductor 32 may be formed of other suitable material such as copper, and the choice of conductive material for the equipotential bonding element 58 may be selected according to the other material choices.

The metallic wire may be woven into the fabric material, in particular glass fibre fabric, so that it can be incorporated into the glass fibre fabric plies in the stack 70 without the use of additional components and will infuse with resin without voids during manufacture of the blade shell 40.

By "stepping" the flat ribbon between the edges of the adjacent stacks 70 of fibre plies the ribbon is kept as flat as possible.

The spar cap 46 may be arranged so as to be equipotentially bonded between the layers of conductive material in the spar cap. The spar cap 46 may include a stack comprising a plurality of layers of conductive material. The conductive material may comprise pultruded fibre composite material, for example carbon fibre reinforced polymer. The pultruded fibres may be oriented in a longitudinal direction of the spar cap 46 which is aligned with the longitudinal or spanwise direction of the blade 20. By equipotentially bonding the adjacent layers of the conductive material 80, undesirable discharges or arcs from the spar cap 46 can be avoided in the event of a lightning strike on the blade 20.

The spar cap 46 may extend over substantially the full length of the blade 20 and has a first end 82 nearest the root end 22 of the blade 20 and a second end 84 adjacent the tip end 24 of the blade. The spar cap 46 has a thickness in the stacking direction of the layers of conductive material 80 which may vary along the length of the spar cap 46. At least one of the ends of the spar cap 46 may be tapered in the thickness direction.

Figure 9:
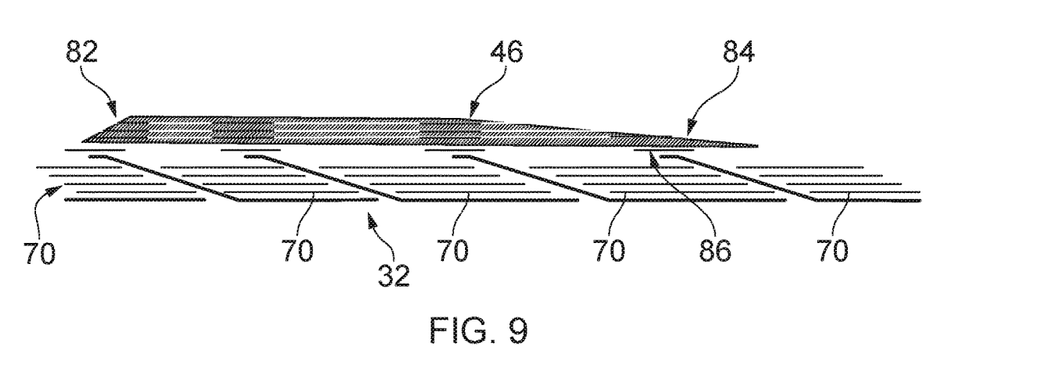
FIG. 9 shows a second example wherein the equipotential bonding elements are integrally formed with respective portions of the surface protection layer and are laid up with respective stacks of plies of the outer shell.
Figure 10:
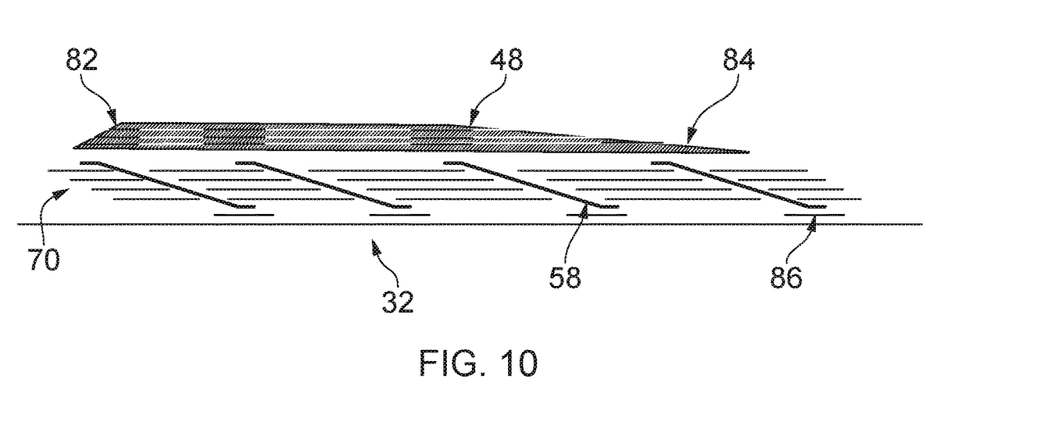
FIG. 10 shows a third example wherein the equipotential bonding elements are laid up between the stacks of plies and contact the surface protection layer via electrically conductive pads.

In the examples shown in FIGS. 8 to 10 both ends of the spar cap 46 are tapered. The taper is formed by cutting each of the layers of conductive material 80 to different lengths. The taper at the first end 82 may be steeper than the taper in the second end 84. The shallower taper may be created by terminating the layers 80 sequentially in a stepwise manner. Each of the layers 80 may have the same thickness but alternatively the layers 80 may have different thicknesses. The varying thicknesses of the spar cap 46 along the length of the blade 20 increases from zero nearest the root end 22 and increases to a maximum through the shoulder 30 and then decreases towards the tip end 24 of the blade 20. At least one of the layers of conductive material 80 has a chamfered end at each end of the layer. The chamfers may assist with the load transfer to and from the layers 80 of the spar cap 46 into the other material of the blade 40.

Returning to FIG. 3, it can be seen that the metal foil 32 lightning conductor may extend over substantially the whole of the blade surface. A plurality of equipotential bonding elements 58 may connect to the spar cap 46 at various locations along the length of the blade. In particular, a first one of the equipotential bonding elements 58 may connect to the spar cap 46 at the tip end 84 of the spar cap 46, and a second one of the equipotential bonding elements 58 may connect the metal foil 32 to the first (root) end 82 of the spar cap 46. Further intermediate equipotential bonding elements 58 connect the metal foil 32 lightning conductor to mid-span regions of the spar cap 46, respectively.

With the electrical connections provided by the equipotential bonding elements 58 at both the root end and the tip end of the blade there will be a voltage drop between the first and second ends 82, 84 of the spar cap 46. Depending on the length of the blades 20, and particularly on the length of the longest layer of conductive material 80 in the spar cap 46, the value of the voltage drop between the first and second ends 82, 84 of the spar cap 46 will vary. If this voltage drop is below a threshold value at which flashover from the lightning conductor to one or more of the layers 80 of the conductive material may occur, then the provision of the equipotential bonding elements 58 at only the ends 82, 84 of the spar cap 46 may be sufficient. However, if the voltage drop between the ends 82, 84 of the spar cap 46 is above the threshold then one or more further equipotential bonding elements 58 may be required to electrically bond the metal foil 32 to an intermediate point of the spar cap 46 between the first and second ends 82, 84.

FIG. 8 illustrates a first example in which the equipotential bonding elements 58 provide direct attachment and electrical contact with the metal foil 32 at first ends thereof, and direct attachment and electrical contact with the outer surface 46a of the lowermost layer of conductive material 80 of the spar cap 46. In this first example, the equipotential bonding elements 58 may comprise copper braid and the metal foil 32 may comprise aluminium.

FIG. 9 illustrates a second example in which the equipotential bonding elements 58 are integrally formed with the lightning conductor 32. In this example, the lightning conductor 32 comprises discrete portions of the metal foil which extend across the outer surface of the blade and then progress through between the inboard and outboard edges 71, 72 of adjacent stacks of fibre plies 70. The discrete portions of the metal foil 32 may be combined with the stack of fibre plies 70 such that the metal foil 32 is laid up with the stack 70 in the mould 60. Alternatively each portion of metal foil 32 and integrated equipotential bonding elements 58 may be laid up in the mould next to the previously laid stack of fibre plies 70 and before the next adjacent stack of fibre plies 70 is laid up. The metal foil 32 may again comprise aluminium and so a conductive pad 86, e.g. including copper material, may be provided between the ends of the metal foil 32 and the outer surface 46a of the spar cap 46. The choice of copper material in the pad 86 may be so as to avoid galvanic reaction between the carbon material of the spar cap 46 and the aluminium foil lightning conductor 32. The pad 86 may include one or more of a variety of other conductive materials, such as tin, lead, carbon, etc.

FIG. 10 illustrates a third example similar to FIG. 8, but in which the equipotential bonding elements 58 comprise a conductive carbon material, e.g. a carbon weave. Conductive pads 86, e.g. including copper material, may be provided between the conductive carbon equipotential bonding elements 58 and the aluminium metal foil 32 so as to break the galvanic series.

Depending on the material of the metal foil 32, and the material of the equipotential bonding elements 58, the material of the conductive pads 86 may be selected to avoid a galvanic reaction.

As described above, the ends of the layers 80 of conductive material in the spar cap 46 may be chamfered so as to ease load transfer between the layers 80 of the spar cap 46 and the rest of the blade shell 40. The layers of pultruded carbon fibre composite material may be cut to a desired length and then the ends 82, 84 of the layers 80 may be ground to achieve the desired chamfer profiles before the layers 80 are stacked to form the spar cap 46.

To ensure good electrical contact between the equipotential bonding element 58 and the conductive material of the spar cap 46, the conductive material in the layer 80 may need to be exposed, i.e. so that it is not covered with (insulating) resin. The same grinding process used to form the chamfers at the ends 82, 84 of the layers 80 may also be used to expose the conductive material to provide a suitable attachment surface for providing a good electrical connection between the conductive material of the spar cap 46 and the equipotential bonding element 58. Alternatively, the electrical connection between the conductive material of the spar cap 46 and the equipotential bonding element 58 may be achieved sufficiently through contact pressure without treating or otherwise exposing the conductive material in the layer 80.

Figure 11:
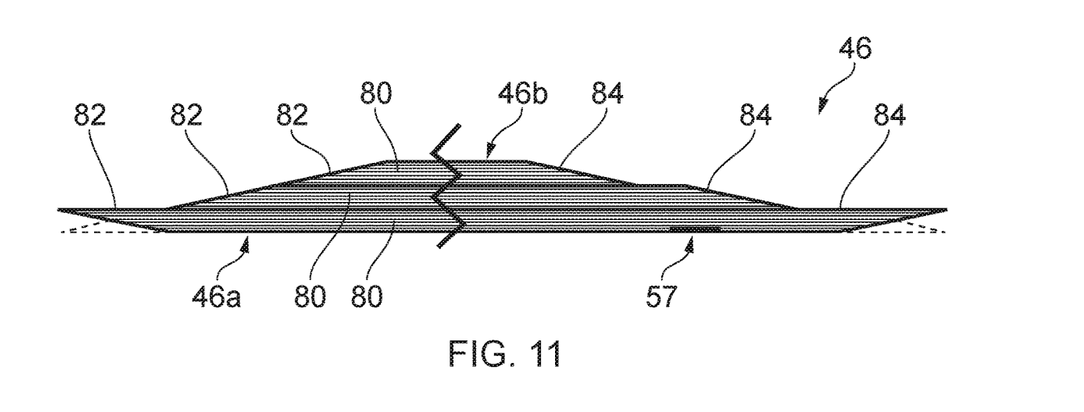
FIG. 11 shows a schematic spanwise section of the layers of conductive material of the spar cap, with chamfers at each end, and with the lowermost layer inverted.

FIG. 11 shows an example where the respective ends 82, 84 of each of a plurality of the layers 80 of conductive material are chamfered. The lowermost layer 80 in the stack also has a connection point 57 at which the equipotential bonding element 58 is to be attached and put in electrical contact with the spar cap 46. The contact point 57 may comprise an abraded portion to reveal the conductive material.

Advantageously, the chamfers at the ends 82, 84 and the abraded portion at the contact portion 57 may each be provided on the same side of the layer 80. The contact point 57 may be provided on the lowermost layer 80 in the stack on the lowermost (outer) side 46a of the spar cap 46 which faces towards the lightning conductor 32. In the example illustrated in FIG. 11, each of the layers 80 may be subject to a grinding process, or other known processes, to form the chamfered ends and the abraded portion at the contact point 57 on only one side of each of the layers 80.

It will be appreciated that the lowermost layer 80 shown in FIG. 11 has been inverted after completion of the chamfering processes so that the chamfered ends 82, 84 of the lowermost layer 80 face in the opposite direction to those of the layers 80 above in the stack which forms the spar cap 46. Once the layup of the blade shell 40 is complete, the consolidation will cause the chamfered ends 82, 84 of the lower most layer 80 in the stack to deflect downwardly to the shape shown in broken line.

It will be appreciated that, in the alternative, the lowermost layer 80 in the stack may be subject to a first process for forming the chamfered ends 82, 84 on the upper side of the layer 80 and to a second process for forming the abraded portion at the contact point 57 on the lowermost side of the layer 80. Whilst this would necessitate processing operations from two different sides of the layer 80 there would be advantages in avoiding the need to invert the lowermost layer 80 of the stack prior to laying-up the other layers 80 to form the stack of layers 80 of the spar cap 46. As an alternative to the above described grinding process to remove material to expose the conductive material of the layers 80, a variety of other known processes such as etching, or laser or chemical activation may alternatively be used.

Figure 12:
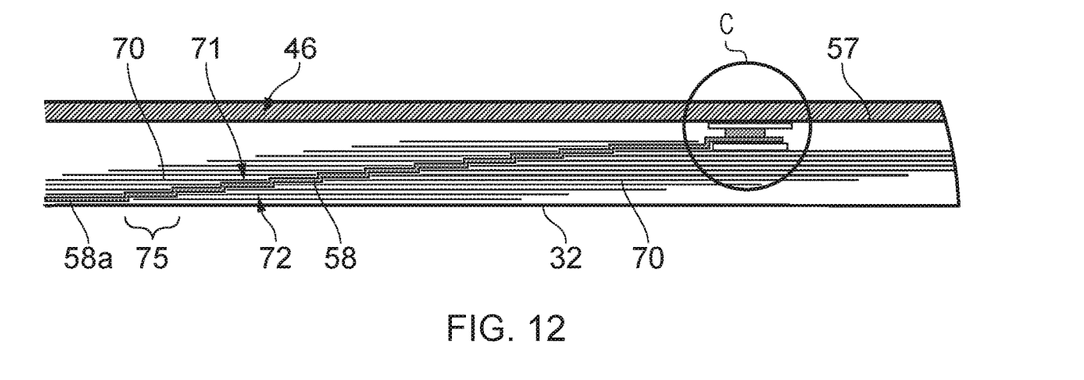
FIG. 12 shows another schematic spanwise section of an adjacent pair of stacks of plies of the outer shell, with the equipotential bonding element extending from the surface protection layer to the spar cap through the overlapping edges of the stacks of plies.
Figure 13:
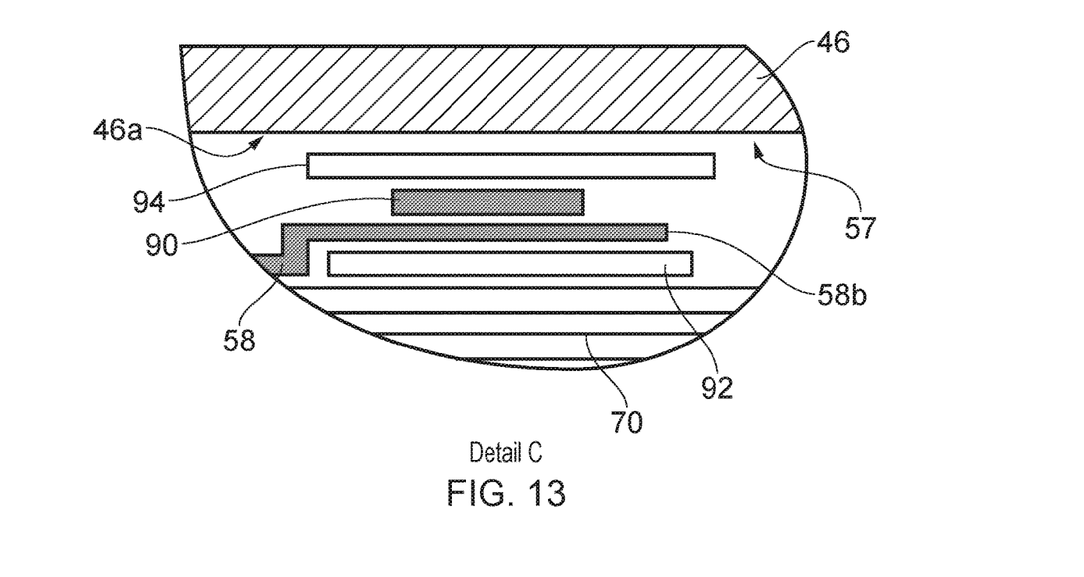
FIG. 13 shows detail A of FIG. 12.

FIGS. 12 and 13 show further detail of how the equipotential bonding element 58 may be attached and in electrical contact with the spar cap 46. FIG. 13 shows detail C of FIG. 12 in which a plurality of the chordwise extending equipotential bonding elements 58 extend through the same overlapping region 75 between an outboard edge 71 of one of the stacks 70 and an inboard edge 72 of an adjacent stack 70. Each of the plurality of spanwise extending equipotential bonding elements 58 at this overlap region 75 may be in electrical contact with a chordwise extending equipotential bonding element 90 which connects the respective ends 58b of the adjacent spanwise equipotential bonding elements 58 at that overlapping region 75.

A first electrically conductive pad 92 is provided between the inner-most surface of the stack of fibre plies 70 and the end 58b of the spanwise extending equipotential bonding element 58. A second electrically conductive contact pad 94 is provided between the chordwise extending equipotential bonding element 90 and the contact point 57 on the outermost surface 46a of the spar cap 46. The first contact pad 92 may comprise a steel fleece. The second contact pad 94 may comprise a carbon fleece. The chordwise extending equipotential bonding element 90 may have the same or similar structure and materials to the spanwise extending equipotential bonding elements 58.

The electrical connection between the conductive material of the spar cap 46 and the equipotential bonding element 58 may take a variety of forms. For example a contact pad may provide the electrical connection between the conductive material of the spar cap 46 and the equipotential bonding element 58. The contact pad may be a metallic interface, such as a nickel interface or strip.

Similarly, the electrical connection between the metal foil 32 or other lightning conductor and the equipotential bonding element 58 may take a variety of forms. For example a contact pad may provide the electrical connection between the metal foil 32 and the equipotential bonding element 58.

Figure 14:
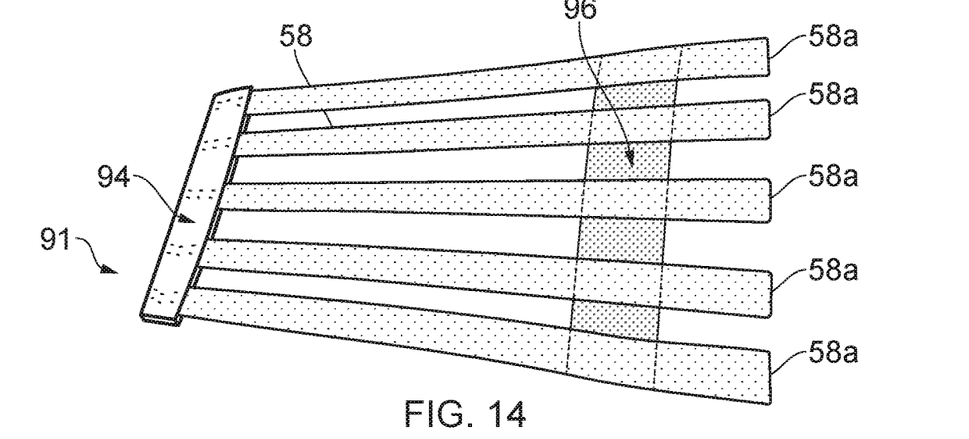
FIGS. 14 to 16 show alternative arrangements of the equipotential bonding elements.
Figure 15:
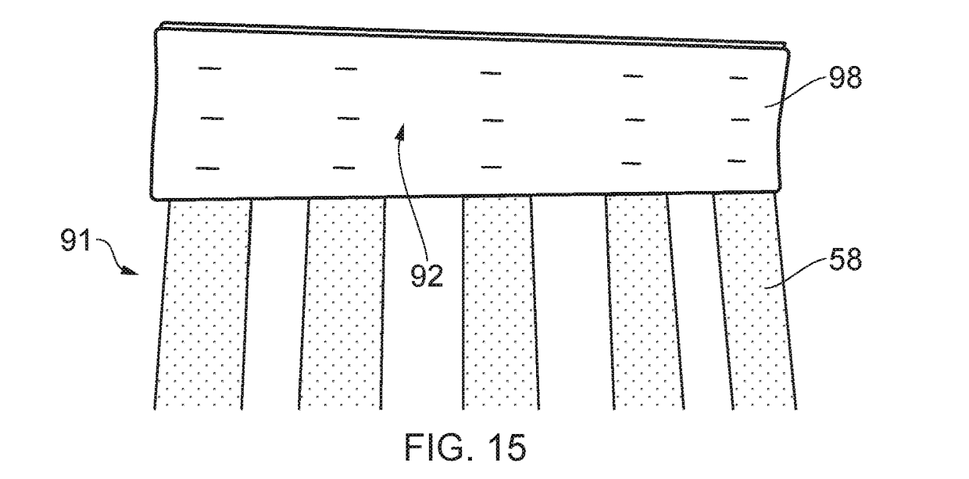
Figure 16:
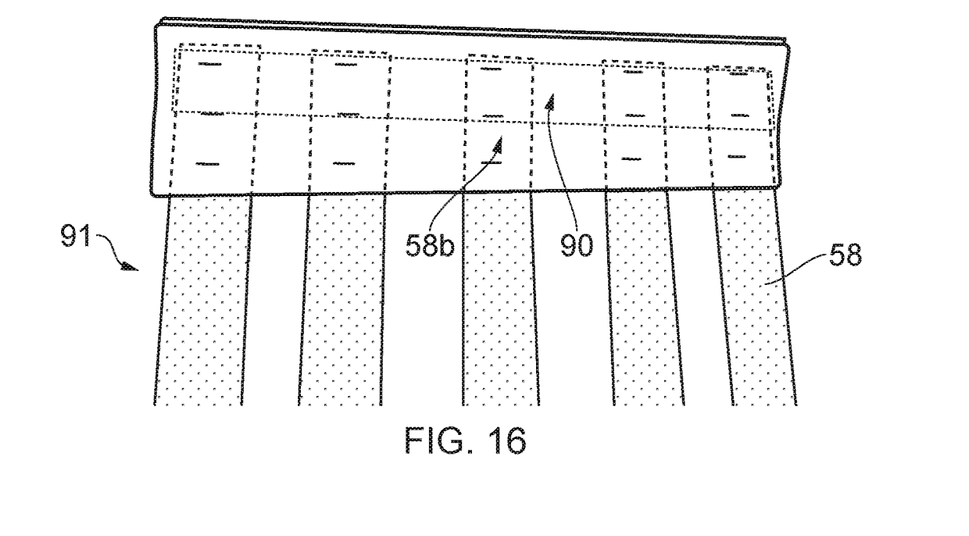

FIGS. 14 to 16 illustrate in detail an example of an assembly 91 of the equipotential bonding elements 58 shown in FIGS. 12 and 13. The equipotential bonding element assembly 91 may comprise several, e.g. five, of the spanwise extending equipotential bonding elements 58. The equipotential bonding elements 58 may be formed as ribbons or strips of glass fibre fabric with tin coated copper braid woven into the glass fibre fabric, or any other suitable materials, as described previously.

A transverse strip 96 of non-structural fibre fabric may extend across the equipotential bonding elements 58. The transverse strip 96 may extend adjacent but away from the ends 58a and may act so as to stabilise the assembly 91. The transverse strip 96 may comprise biaxial glass fibre fabric, for example. The second electrically conductive contact pad 94 may extend transverse to the spanwise extending equipotential bonding elements 58 at their ends 58a so as to form the contact surface of the assembly 91 with the surface 46a of the spar cap 46. The second electrically conductive contact pad 94 may comprise carbon fleece for example. Alternatively, the transverse strip 96 may be omitted and a plurality of the equipotential bonding elements 58 may be laid up discretely through the gaps between the stacks of plies, i.e. the plurality of the equipotential bonding elements 58 are not joined together transversely prior to lay-up.

On the other side of the equipotential bonding elements 58 to the second electrically conductive contact point 94, the first electrically conductive contact pad 92, which may comprise steel fleece for example, extends across the set of equipotential bonding elements 58. The first and second electrically conductive pads 92, 94 may be secured to the equipotential bonding elements 58, e.g. by tags 98 which may comprise nylon or other suitable materials. The transverse, chordwise extending equipotential bonding element 90 extends between the first and second electrically conductive contact pads 92, 94 as indicated by the shadow broken line in FIG. 16. The spanwise extending equipotential bonding elements 58 have their ends 58*b* extending between the first and second contact pads 92, 94, again as shown by the shadow broken line in FIG. 16.

In another example, the equipotential bonding element 58 may be a sheet of conductive material (see FIG. 3), instead of the assembly 91 of strips of equipotential bonding elements. The equipotential bonding element 58 formed as a sheet may have a width in the blade chordwise direction and a length in the blade spanwise direction. The width of the sheet may be greater than its length. The sheet may comprise materials similar to those of the strips of equipotential bonding elements described above. The electrical connection of the sheet to the conductive material of the spar cap 46 and/or to the metal foil 32 may be as described above.

During manufacturing of the blade 20, the blade shell 40 is laid up as described above. Where the fibre plies 70, e.g. of glass fibre material, are dry fibre fabric the layup undergoes a resin infusion, consolidation and curing process to fully infuse the fabric with resin which then cures to bond (mechanically) the structure of the blade shell 40 together. During this process the fibre fabric of the equipotential bonding elements 58, 90 and/or the fleeces of the first and/or second electrically conductive contact pads 92, 94, where these are dry fibre fabric materials, will also infuse with the resin which is consolidated and cured in the same process.

Alternatively, the blade shell 40 may include stacks of fibre plies 70 of pre-preg material. In this case the layup will not need to undergo a resin infusion process but will undergo a consolidation and curing process to bond (mechanically) the structure of the blade shell 40 together. During this process, the fibre fabric of the equipotential bonding elements 58, 90 and the materials of the first and second contact pads 92, 94, where these also include pre-preg or dry fabric materials may be consolidated and cured in the same process. In the case of dry fabric, these may take up resin from surrounding materials during the resin flow period to then become fully integrated into the blade laminate.

By either process, the consolidation may ensure the conductive material of the spar cap 46 is electrically coupled to the equipotential bonding element 58, and curing mechanically bonds the spar cap 46, the equipotential bonding elements 58 and the stacks of fibre plies 70.

The wind turbine blade 20 is shown as a single complete blade but in other examples the blade may be a "split" or "segmented" blade which comprises a plurality of blade portions which are joined together for form the complete blade. For instance, the wind turbine blade may include a first wind turbine blade portion and a second wind turbine blade portion, which may be connected at a joint to form the complete blade. It will be understood that a blade may have three or more blade portions with a joint between adjacent blade portions.

The wind turbine rotor blade may further comprise a stringer in the form of a trailing edge stringer or secondary spar adjacent the trailing edge of the blade. The stringer may be incorporated in the blade shell 40. The stringer may extend longitudinally along the length of the blade from root to tip, or along at least a portion of that length. A stringer may be provided in each half of the blade shell 40*a*, 40*b*. Typically no shear web extends between the stringers. If a shear web is present then the shear web and "stringers" will form a secondary spar structure in which the "stringers" form the spar caps. The stringer or secondary spar may include conductive material, e.g. carbon fibre material. The carbon fibre material may be unidirectional, aligned with the longitudinal direction of the blade. The carbon fibre material may include pultruded carbon fibrous material similar to the spar caps described previously. Where the stringers or spar caps of the secondary spar include conductive material this may be electrically bonded to the lightning conductor. The electrical bonding may be arranged similarly to that as for the spar cap described previously.

Although the invention has been described above with reference to one or more preferred embodiments, it will be appreciated that various changes or modifications may be made without departing from the scope of the invention as defined in the appended claims.

The invention claimed is:

1. A wind turbine rotor blade having a root end and a tip end, comprising:
   a wind turbine blade shell that defines a suction side, pressure side, leading edge, and a trailing edge of the blade;
   at least one spar cap associated with the blade shell and including a conductive material;
   a lightning conductor; and
   an equipotential bonding element electrically bonding the lightning conductor to the spar cap,
   wherein the blade shell includes a plurality of stacks of fibre plies, each stack of fibre plies has an inboard edge towards the root end of the blade, an outboard edge towards the tip end of the blade, a forward edge towards the leading edge of the blade, and a rear edge towards the trailing edge of the blade,
   wherein the equipotential bonding element extends between an outboard edge of one stack and an inboard edge of an adjacent stack which overlap to define an overlapping region extending across the spar cap.

2. The wind turbine rotor blade according to claim 1, wherein the equipotential bonding element has a first end attached to and in electrical contact with the lightning conductor, and a second end attached to and in electrical contact with the spar cap.

3. The wind turbine rotor blade according to claim 1, wherein the spar cap has an outer side, and an inner side nearest an interior of the blade, and wherein the equipotential bonding element is attached to and in electrical contact with the outer side of the spar cap.

4. The wind turbine rotor blade according to claim 1, wherein the equipotential bonding element is a strip or ribbon.

5. The wind turbine rotor blade according to claim 4, wherein the strip or ribbon includes electrically conductive wire or yarn woven into a fabric.

6. The wind turbine rotor blade according to claim 1, wherein the equipotential bonding element is attached to the lightning conductor and to the spar cap, the equipotential bonding element defining a path between an attachment point with the lightning conductor and the spar cap, the path extending from the lightning conductor to the spar cap in a direction only away from the attachment point and not also back towards the attachment point.

7. The wind turbine rotor blade according to claim 1, wherein the spar cap includes a stack of layers of conductive material.

8. The wind turbine rotor blade according to claim 7, wherein the conductive material includes carbon fibre material.

9. The wind turbine rotor blade according to claim 7, wherein the conductive material includes pultruded carbon fibre composite material.

10. The wind turbine rotor blade according to claim 1, wherein the spar cap has an abraded portion to reveal the conductive material where the equipotential bonding element is attached to and in electrical contact with the spar cap.

11. The wind turbine rotor blade according to claim 7, wherein at least one of the layers of the spar cap is chamfered at at least one end thereof such that the thickness of the layer is tapered towards at least one end.

12. The wind turbine rotor blade according to claim 10, wherein the layer of the spar cap nearest the lightning conductor has a chamfered end and an abraded portion on the same side of the layer facing towards the lightning conductor.

13. The wind turbine rotor blade according to claim 1, wherein the stacks of fibre plies of the blade shell include glass fibre material.

14. The wind turbine blade according to claim 1, wherein the stacks of fibre plies of the blade shell have their forward edges at or adjacent the leading edge of the blade, and have their rear edges at or adjacent the trailing edge of the blade.

15. The wind turbine blade according to claim 1, wherein each stack of fibre plies of the blade shell is provided as a preform.

16. The wind turbine rotor blade according to claim 1, wherein the overlapping edges of the adjacent stacks of fibre plies are formed by consecutively terminating individual layers in the stack to form a staircase or ramp.

17. The wind turbine rotor blade according to claim 1, wherein the lightning conductor is a metallic foil of a lightning protection system.

18. The wind turbine rotor blade according to claim 1, wherein the lightning conductor is at an outer surface of the blade.

19. The wind turbine rotor blade according to claim 1, further comprising a plurality of the equipotential bonding elements.

20. The wind turbine rotor blade according to claim 19, wherein a plurality of the equipotential bonding elements extend between the outboard edge of one stack and the inboard edge of the adjacent stack.

21. The wind turbine rotor blade according to claim 19, wherein a plurality of pairs of adjacent stacks spaced spanwise along the blade have at least one of the equipotential bonding elements extending between the outboard edge of one stack and the inboard edge of the adjacent stack in the pair.

22. The wind turbine rotor blade according to claim 1, wherein the lightning conductor and the equipotential bonding element are integrally formed.

23. A method of manufacturing a wind turbine rotor blade having a root end and a tip end, comprising:
    laying up a shell of a wind turbine rotor blade that defines a suction side, pressure side, leading edge, and a trailing edge of the blade, the shell including a plurality of stacks of fibre plies and a lightning conductor, each stack of fibre plies has an inboard edge towards the root end of the blade, an outboard edge towards the tip end of the blade, a forward edge towards the leading edge of the blade, and a rear edge towards the trailing edge of the blade;
    laying up a spar cap such that the lightning conductor extends over the spar cap, wherein the spar cap includes conductive material; and
    providing an equipotential bonding element to electrically bond the lightning conductor to the spar cap, the equipotential bonding element extending between an outboard edge of one stack and an inboard edge of an adjacent stack which overlap to define an overlapping region extending across the spar cap.

24. The method according to claim 23, wherein each stack of fibre plies of the blade shell is laid up in a mould as a preform, and further comprising infusing the preforms with resin and curing.

25. The method according to claim 23, wherein the equipotential bonding element is attached to one of the stacks of fibre plies of the blade shell prior to being laid up.

26. The method according to claim 23, wherein the lightning conductor and the equipotential bonding element are integrally formed and the lightning conductor and the equipotential bonding element are attached to one of the stacks of fibre plies of the blade shell prior to being laid up.

* * * * *